US010893070B2

(12) United States Patent
Wang et al.

(10) Patent No.: US 10,893,070 B2
(45) Date of Patent: Jan. 12, 2021

(54) DETECTING A PAGE FOR A REAL-WORLD ENTITY, AN IMPOSTER OF A REAL-WORLD ENTITY, OR A NON-REAL-WORLD ENTITY THAT COMPLIES WITH OR VIOLATES A POLICY OF AN ONLINE SYSTEM

(71) Applicant: Facebook, Inc., Menlo Park, CA (US)

(72) Inventors: Haotian Wang, Seattle, WA (US); Komal Kapoor, Issaquah, WA (US); Gaurav Singh Thakur, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 126 days.

(21) Appl. No.: 16/388,058

(22) Filed: Apr. 18, 2019

(65) Prior Publication Data

US 2020/0336509 A1 Oct. 22, 2020

(51) Int. Cl.
*G06F 7/04* (2006.01)
*H04L 29/06* (2006.01)
*G06N 20/20* (2019.01)
*H04L 29/08* (2006.01)
*G06F 16/951* (2019.01)

(52) U.S. Cl.
CPC ........ *H04L 63/1483* (2013.01); *G06F 16/951* (2019.01); *G06N 20/20* (2019.01); *H04L 63/20* (2013.01); *H04L 67/22* (2013.01); *H04L 67/306* (2013.01)

(58) Field of Classification Search
CPC ............ H04L 63/1416; H04L 63/1433; G06F 16/95; G06F 16/951; G06F 21/6218
See application file for complete search history.

(56) References Cited

U.S. PATENT DOCUMENTS

| 9,349,099 | B2 | 5/2016 | Pinckney et al. |
| 10,643,112 | B1 * | 5/2020 | Mu ..................... G06K 9/00268 |
| 10,757,137 | B1 * | 8/2020 | Roturier ................. G06N 20/00 |
| 2004/0078422 | A1 * | 4/2004 | Toomey .............. H04L 63/1466 |
| | | | 709/202 |
| 2010/0095375 | A1 * | 4/2010 | Krishnamurthy ..... G06F 21/554 |
| | | | 726/22 |

(Continued)

OTHER PUBLICATIONS

PCT International Search Report and Written Opinion, PCT Application No. PCT/US2020/027650, dated Jun. 8, 2020, 14 pages.

*Primary Examiner* — Farid Homayounmehr
*Assistant Examiner* — Lizbeth Torres-Diaz
(74) *Attorney, Agent, or Firm* — Fenwick & West LLP

(57) ABSTRACT

An online system maintains pages and accesses a graph of nodes representing the pages. Each node is labeled to indicate that a corresponding page is for a real-world entity, an imposter of the real-world entity, or a derived entity complying with or violating a policy. The online system retrieves machine-learning models, each of which is trained based on labels for a set of the nodes and features of corresponding pages. A first model predicts whether a page is for a derived entity based on features of the page. Responsive to predicting the page is not for a derived entity, a second model predicts whether the page is for a real-world entity or an imposter based on features of the page. Responsive to predicting the page is for a derived entity, a third model predicts whether the derived entity complies with or violates the policy based on features of the page.

20 Claims, 4 Drawing Sheets

(56) References Cited

U.S. PATENT DOCUMENTS

| | | | |
|---|---|---|---|
| 2010/0251380 A1* | 9/2010 | Zhang | G06F 21/31 |
| | | | 726/26 |
| 2011/0185421 A1* | 7/2011 | Wittenstein | H04L 63/1416 |
| | | | 726/22 |
| 2015/0067853 A1* | 3/2015 | Amrutkar | H04L 63/14 |
| | | | 726/23 |
| 2015/0127597 A1* | 5/2015 | Pinckney | G06Q 50/01 |
| | | | 706/52 |
| 2019/0066009 A1* | 2/2019 | Lin | G06Q 30/0269 |
| 2020/0036749 A1* | 1/2020 | Ferres | H04L 63/1483 |
| 2020/0137110 A1* | 4/2020 | Tyler | H04L 63/145 |

* cited by examiner

DETECTING A PAGE FOR A REAL-WORLD ENTITY, AN IMPOSTER OF A REAL-WORLD ENTITY, OR A NON-REAL-WORLD ENTITY THAT COMPLIES WITH OR VIOLATES A POLICY OF AN ONLINE SYSTEM

TECHNICAL FIELD

This disclosure relates generally to online systems, and more specifically to detecting a page for a real-world entity, an imposter of a real-world entity, or a non-real-world entity that complies with or violates a policy of an online system.

BACKGROUND

Conventionally, online systems allow entities to create pages to establish their presence in the online systems and to connect and exchange content with other entities or users of the online systems. Pages may be created for entities that are real-world entities, such as businesses or organizations. Pages also may be created for "derived entities," which are non-real-world entities that are not owned or authorized by real-world entities, but which are related to real-world entities. Examples of pages for derived entities include fan pages, meme pages, discussion pages, etc. For example, a fan page for a real-world entity, such as a baseball team, is a page for a derived entity that is related to the real-world entity.

Pages that share features similar to those for real-world entities or derived entities (e.g., pages having similar titles/names, similar profile/cover images, etc.) also may be created for the purpose of intentionally misleading online system users to interact with them. These pages may be created by imposters of real-world entities or other entities to take advantage of the popularity of similar pages. In the above example, if a page for the baseball team has a name or title corresponding to the name of the baseball team and a profile/cover image corresponding to the logo for the baseball team, another page having the same name/title and profile/cover image may be created by an imposter of the baseball team to sell a product or a service that is unrelated to the baseball team. Although online systems typically adopt policies prohibiting these types of pages from being created (e.g., policies that prohibit the impersonation of an entity, policies that prohibit the creation of pages that are misleading, etc.), such policies may be difficult to enforce because they often rely on reporting by online system users and may require manual review of reported pages, delaying any policy enforcement actions that may be taken against these pages. Therefore, absent a more efficient process by which online systems may detect pages that violate these policies, online system users may be misled into interacting with pages in which they do not have an interest.

SUMMARY

Online systems conventionally allow entities, such as real-world entities and derived entities, to create pages to establish their presence in the online systems and to connect and exchange content with other entities or users of the online systems. Pages that share features similar to those for real-world entities or derived entities also may be created for the purpose of intentionally misleading online system users to interact with them. Since policies typically adopted by online systems that prohibit these deceptive pages from being created may be difficult to enforce, online system users may be misled into interacting with pages in which they do not have an interest.

To resolve this issue, an online system detects a page for a real-world entity, an imposter of a real-world entity, or a non-real-world entity that complies with or violates a policy of the online system. More specifically, the online system maintains various pages for a set of real-world entities, a set of imposters of the real-world entities, and a set of derived entities (i.e., non-real-world entities related to the real-world entities) and accesses a graph of nodes representing the pages. Each node is labeled to indicate that a corresponding page is for a real-world entity, an imposter of the real-world entity, or a derived entity that complies with or violates a policy of the online system. The online system retrieves multiple machine-learning models, each of which is trained based on labels for a set of the nodes and features of the corresponding pages. The online system uses a first machine-learning model to predict whether a page maintained in the online system is for a derived entity based on a set of features of the page. Responsive to predicting that the page is not for a derived entity, the online system uses a second machine-learning model to predict whether the page is for a real-world entity or an imposter of a real-world entity based on the features of the page. Responsive to predicting that the page is for a derived entity, the online system uses a third machine-learning model to predict whether the page is for an entity that complies with or violates the policy based on the features of the page.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
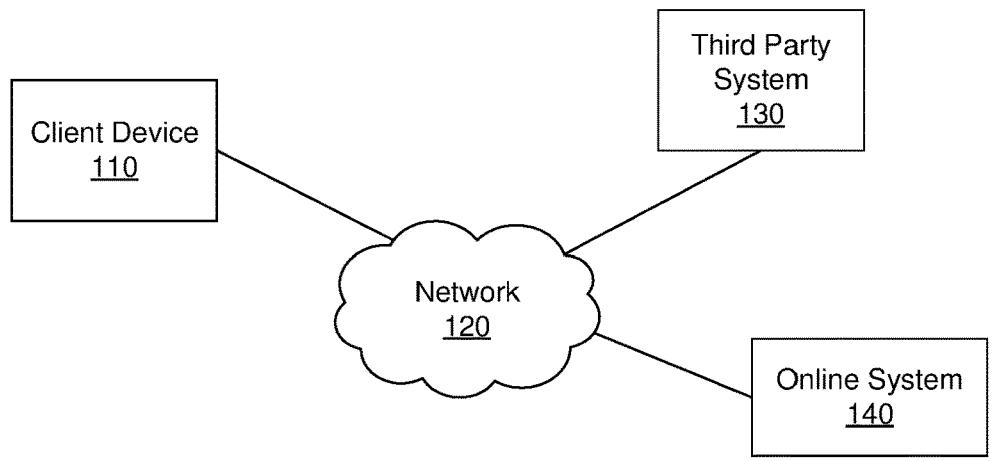
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
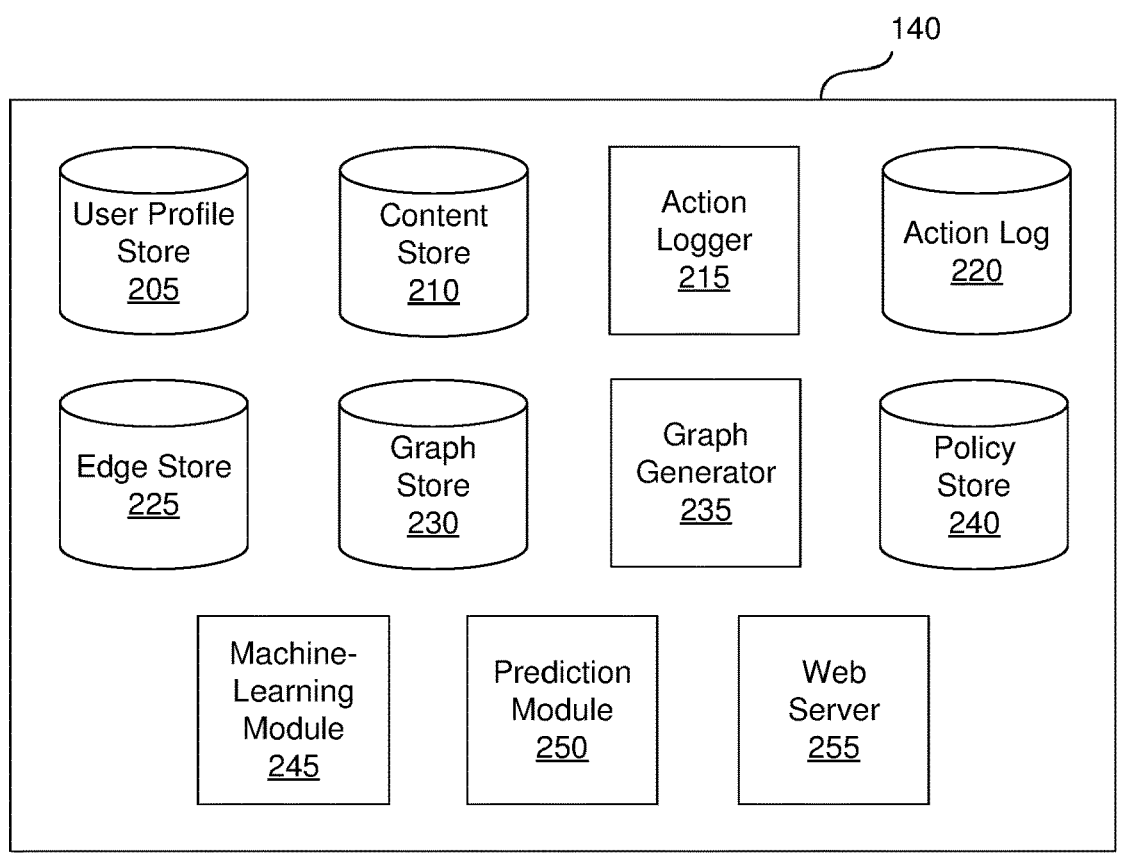
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a graph store 230, a graph generator 235, a policy store 240, a machine-learning module 245, a prediction module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, an image (e.g., a photograph), a video, a link, a shared content item, a gaming application achievement, a check-in event at a local business, a page (e.g., a brand page or a user profile page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Various types of pages may be represented by objects stored in the content store 210. Pages represented by objects stored in the content store 210 may include pages for real-world entities, such as businesses or organizations that exist in the real world and/or pages for imposters of real-world entities (i.e., pages that are created to deceive other online system users to believe that the pages were created by, at the direction of, or otherwise authorized by the real-world entities). Pages represented by objects stored in the content store 210 also may include pages for derived entities. As described above, a derived entity is a non-realworld entity that is not owned or authorized by a real-world entity, but which is related to a real-world entity. Pages for derived entities may or may not violate a policy of the online system 140 stored in the policy store 240 (described below). For example, pages for derived entities that comply with a policy of the online system 140 may include fan pages, meme pages, or discussion pages that are associated with a real-world entity. As an additional example, a page for a derived entity that violates a policy of the online system 140 may include a "fame hijacking page" that is intentionally misleading to take advantage of the popularity of similar pages for derived entities that comply with the policy.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The graph store 230 stores one or more graphs of nodes, in which each graph includes multiple nodes and each node represents a page maintained in the online system 140. Nodes within the same graph may be connected by one or more edges representing relationships among the corresponding pages. Each node within a graph also may have a label that describes the page it represents. In some embodiments, a label for a node may indicate that a corresponding page is for a real-world entity, an imposter of a real-world entity, a derived entity that violates a policy of the online system 140, or a derived entity that complies with the policy. To illustrate an example of a graph stored in the graph store 230, suppose that a first node within the graph represents a page for a real-world entity. In this example, an edge may connect the first node to a second node within the graph if a page represented by the second node is for a derived entity associated with the real-world entity (e.g., a page for fans of the real-world entity or a page to discuss the real-world entity). Continuing with this example, an additional edge also may connect the first node representing the page for the real-world entity to a third node representing a page for an imposter of the real-world entity. In various embodiments, information describing relationships among pages may be stored in association with edges connecting nodes representing the pages. The graph store 230 is further described below in conjunction with FIGS. 3 and 4.

The graph generator 235 may generate (e.g., as shown in step 310 of FIG. 3) a graph of nodes representing pages maintained in the online system 140. The graph generator 235 may do so by first identifying pages maintained in the online system 140 (e.g., in the content store 210) having at least a threshold measure of similarity to each other. For example, the graph generator 235 may generate one or more embeddings corresponding to a page that has been verified to be for a real-world entity based on a set of features of the page (e.g., by using a word embedding method, such as word2vec, to produce embeddings from text included in the page and/or by using a visual embedding method, such as a convolutional neural network, to produce embeddings from one or more images included in the page). In this example, the graph generator 235 also may generate one or more embeddings corresponding to additional pages maintained in the online system 140 in a similar manner. Continuing with this example, the graph generator 235 may then identify pages having at least a threshold measure of similarity to the page that has been verified to be for the real-world entity (e.g., by identifying pages corresponding to the k-nearest neighboring embeddings of the embedding(s) corresponding to the page that has been verified to be for the real-world entity). The graph generator 235 may then generate a node representing each page and assign a label to each node, in which the label describes the page it represents. In some embodiments, the graph generator 235 may assign a label to each node based on a heuristic. For example, the graph generator 235 may determine that pages mentioning "fan page," "fans of," etc. in their titles are fan pages and therefore should be assigned labels indicating that they are pages for derived entities. Alternatively, in some embodiments, the labels may be assigned to the nodes using a different technique (e.g., based on a manual review of the pages). Finally, based on the labels assigned to the nodes, the graph generator 235 may generate edges connecting the nodes (e.g., such that an edge connects a node having a label indicating that it represents a page for a real-world entity to each additional node).

In some embodiments, once the prediction module 250, described below, has used a machine-learning model to make a prediction about a page maintained in the online system 140, the graph generator 235 may generate or update a graph of nodes stored in the graph store 230. For example, if the prediction module 250 uses a machine-learning model to predict that a first page maintained in the online system 140 is for a real-world entity, the graph generator 235 may generate a new graph of nodes by generating a first node corresponding to the first page and by labeling the first node to indicate that the first page is for the real-world entity and store the first node in the graph store 230. In this example, the prediction module 250 subsequently may use a machine-learning model to predict whether a second page maintained in the online system 140 is for an imposter of the real-world entity, a derived entity associated with the real-world entity that violates a policy of the online system 140, or a derived entity associated with the real-world entity that complies with the policy. Continuing with this example, the graph generator 235 may access the graph store 230 and generate a second node corresponding to the second page, assign a label to the second node corresponding to the prediction, and generate an edge connecting the first node to the second node. The functionality of the graph generator 235 is further described below in conjunction with FIGS. 3 and 4.

The policy store 240 stores one or more policies of the online system 140. Examples of policies of the online system 140 include policies that prohibit the impersonation of an entity, policies that prohibit the creation of a page that is misleading (e.g., to take advantage of the popularity of similar pages), etc. For example, if a policy of the online system 140 prohibits the impersonation of an entity, a page that states it is an "official" page for a real-world entity may be prohibited if the page was not authorized by the real-world entity. As an additional example, if a policy of the online system 140 prohibits the creation of a page that is misleading, the policy would prohibit the creation of a page that appears to be a legitimate fan page for a real-world entity, but redirects online system users visiting the page to an external website that sells a product or a service unrelated to the real-world entity. The policy store 240 is further described below in conjunction with FIG. 3.

The machine-learning module 245 may train one or more machine-learning models to make various predictions about pages maintained in the online system 140. The machine-learning model(s) may be trained by the machine-learning module 245 using any suitable techniques or algorithms (e.g., supervised, semi-supervised, or unsupervised learning methods). In some embodiments, the machine-learning model(s) may be trained based on features of pages verified and/or predicted to be for real-world entities, imposters of real-world entities, derived entities that violate a policy of the online system 140, and/or derived entities that comply with the policy, as further described below. Furthermore, each machine-learning model may correspond to a neural network (e.g., a Sparse Neural Network) or any other suitable type of machine-learning model. In some embodiments, the machine-learning module 245 trains multiple machine-learning models including a first model that predicts whether a page maintained in the online system 140 is for a derived entity, a second model that predicts whether the page is for a real-world entity or an imposter of a real-world entity, and a third model that predicts whether the page is for a derived entity that violates a policy of the online system 140 or a derived entity that complies with the policy. In other embodiments, the machine-learning module 245 trains a single machine-learning model that predicts whether a page maintained in the online system 140 is for a real-world entity, an imposter of a real-world entity, a derived entity that violates a policy of the online system 140, or a derived entity that complies with the policy.

The machine-learning module 245 may train a machine-learning model based on labels for a set of nodes included in a graph of nodes and a set of features of each corresponding page. Examples of features of a page maintained in the online system 140 include a title of the page, a name associated with the page, a topic of the page, a description of the page, a image (e.g., a cover or profile image) associated with the page, information describing user engagement with the page, a date that the page was created, a fan count for the page, a ratio of fans of the page to followers of the page, a ratio of content posted to the page that is re-shared, information describing a violation of a policy of the online system 140 by the page, content posted to the page by an administrator of the page (e.g., text and/or images included among the content), or any other suitable types of features of a page maintained in the online system 140. For example, the machine-learning module 245 may access a graph of nodes stored in the graph store 230 and retrieve a label for each node included among a set of the nodes. In this example, the machine-learning module 245 also may retrieve a title and a description of each corresponding page (e.g., from the content store 210). Continuing with this example, the machine-learning module 245 also may retrieve information describing user engagement with each corresponding page (e.g., content posted by one or more users of the online system 140 to the page, a number of content items posted to the page, a number of comments on the page, a number of times that the page was shared, a number of times that one or more users of the online system 140 expressed a preference for the page, a number of users of the online system 140 who have established a connection to the page, etc. from the content store 210, the action log 220 and/or the edge store 225). In the above example, the machine-learning module 245 also may access the user profile store 205 and retrieve a set of features of one or more users of the online system 140 who performed an interaction with the page (e.g., demographic information, interests and hobbies of the user(s), etc.).

The machine-learning module 245 may train different machine-learning models based on labels for different sets of nodes included in a graph of nodes and a set of features of each corresponding page. For example, if the machine-learning module 245 trains a first model to predict whether a page maintained in the online system 140 is for a derived entity, the machine-learning module 245 may train this model based on the labels for all nodes included in a graph of nodes and a set of features of each corresponding page. In this example, if the machine-learning module 245 also trains a second model to predict whether the page is for a real-world entity or an imposter of a real-world entity, the machine-learning module 245 may train this model based on the labels for nodes included in the graph of nodes corresponding to pages for real-world entities and pages for imposters of real-world entities and a set of features of each corresponding page. Continuing with this example, if the machine-learning module 245 also trains a third model to predict whether the page is for a derived entity that violates a policy of the online system 140 or a derived entity that complies with the policy, the machine-learning module 245 may train this model based on the labels for nodes included in the graph of nodes corresponding to pages for derived entities that violate the policy and pages for derived entities that comply with the policy and a set of features of each corresponding page. Alternatively, in the above example, if the machine-learning module 245 trains a single machine-learning model to predict whether the page is for a real-world entity, an imposter of a real-world entity, a derived entity that violates a policy of the online system 140, or a derived entity that complies with the policy, the machine-learning module 245 may train this model based on the labels for all nodes included in the graph of nodes and a set of features of each corresponding page. The functionality of the machine-learning module 245 is further described below in conjunction with FIG. 3.

The prediction module 250 retrieves (e.g., as shown in step 320 of FIG. 3) one or more machine-learning models and uses (e.g., as shown in steps 325, 330, and 335) the model(s) to predict various types of information about a page maintained in the online system 140. The prediction module 250 may use the machine-learning model(s) to predict whether pages maintained in the online system 140 are for real-world entities, imposters of real-world entities, derived entities, derived entities that violate a policy of the online system 140, and/or derived entities that comply with the policy. To use a machine-learning model to make a prediction about a page maintained in the online system 140, the prediction module 250 may access various types of information maintained in the online system 140 associated with the page (e.g., in the user profile store 205, the content store 210, the action log 220, and/or the edge store 225), retrieve a set of features of the page, and provide the set of features as an input to a machine-learning model. As described above, features of a page may include a title of the page, a name associated with the page, a topic of the page, etc. The prediction module 250 then receives an output from the machine-learning model corresponding to the prediction.

In various embodiments, the prediction module 250 may receive an output from a machine-learning model that includes one or more scores or probabilities. In such embodiments, the prediction module 250 may interpret the output based on the scores/probabilities. For example, suppose that the prediction module 250 receives an output from a machine-learning model indicating that there is an 88% probability that a page maintained in the online system 140 is for an imposter of a real-world entity, a 12% probability that the page is for a real-world entity, and a 0% probability that the page is for a derived entity. In this example, since the probability that the page is for an imposter of a real-world entity is associated with the highest probability, the prediction module 250 may interpret that the output corresponds to a prediction that the page is for an imposter of a real-world entity.

In some embodiments, based on a prediction about a page maintained in the online system 140 made by a machine-learning model, the prediction module 250 may use an additional machine-learning model to make an additional prediction about the page. For example, if the prediction module 250 uses a first machine-learning model to predict whether a page maintained in the online system 140 is for a derived entity and the first machine-learning model predicts that the page is not for a derived entity, the prediction module 250 may then use a second machine-learning model to predict whether the page is for a real-world entity or an imposter of a real-world entity. Alternatively, in the above example, if the first machine-learning model predicts that the page is for a derived entity, the prediction module 250 may then use a third machine-learning model to predict whether the page is for a derived entity that violates a policy of the online system 140 or a derived entity that complies with the policy. The functionality of the prediction module 250 is further described below in conjunction with FIGS. 3 and 5.

Figure 3:
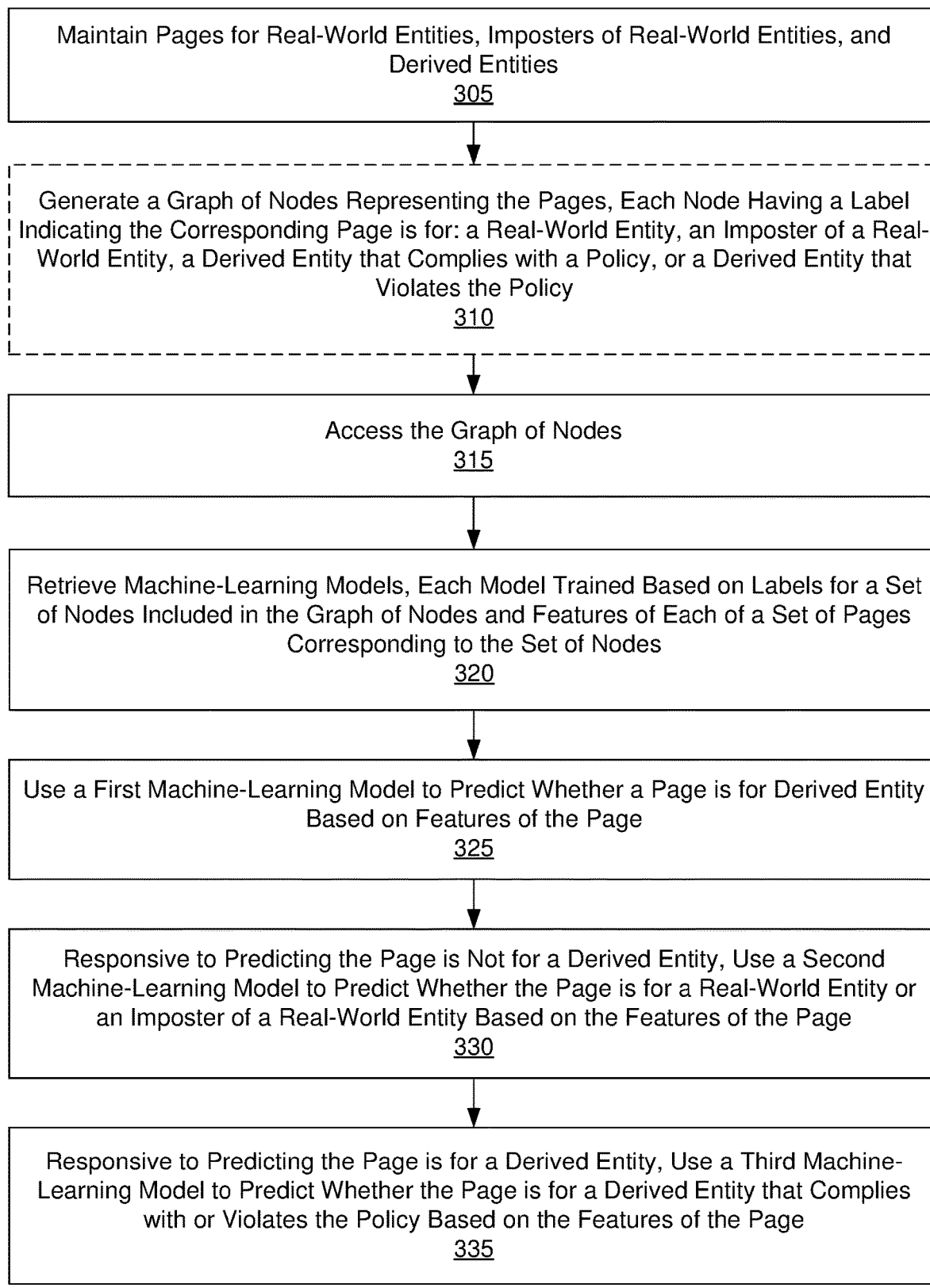
FIG. 3 is a flow chart of a method for detecting a page for a real-world entity, an imposter of a real-world entity, or a non-real-world entity that complies with or violates a policy of an online system, in accordance with an embodiment.

The web server 255 links the online system 140 via the network 120 to the one or more client devices 110, as well as to the one or more third-party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or Blackberry OS Detecting a Page for a Real-World Entity, an Imposter of a Real-World Entity, or a Non-Real-World Entity that Complies with or Violates a Policy of an Online System FIG. 3 is a flow chart of a method for detecting a page for a real-world entity, an imposter of a real-world entity, or a non-real-world entity that complies with or violates a policy of an online system. In other embodiments, the method may include different and/or additional steps than those shown in FIG. 3. Additionally, steps of the method may be performed in a different order than the order described in conjunction with FIG. 3.

The online system 140 maintains 305 multiple pages in the online system 140 (e.g., in the content store 210) for real-world entities, imposters of real-world entities, and/or derived entities. Pages for derived entities may or may not violate a policy of the online system 140 (e.g., stored in the policy store 240), such as a policy that prohibits the impersonation of an entity, a policy that prohibits the creation of a page that is misleading (e.g., to take advantage of the popularity of similar pages), etc. Examples of pages for derived entities that comply with a policy of the online system 140 may include fan pages, meme pages, or discussion pages, associated with a real-world entity while an example of a page for a derived entity that violates a policy of the online system 140 may include a fame hijacking page.

In some embodiments, the online system 140 may generate 310 (e.g., using the graph generator 235) a graph of nodes representing the pages. In such embodiments, the online system 140 may generate 310 the graph of nodes by identifying pages maintained in the online system 140 having at least a threshold measure of similarity to each other (e.g., by generating one or more embeddings corresponding to a page that has been verified to be for a real-world entity and additional pages maintained in the online system 140 and identifying pages corresponding to the k-nearest neighboring embeddings of the embedding(s) corresponding to the page that has been verified to be for the real-world entity. The online system 140 may then generate a node representing each page and assign a label to each node (e.g., based on a heuristic), in which the label describes the page it represents. Based on the labels assigned to the nodes, the online system 140 may then generate edges connecting the nodes (e.g., such that an edge connects a node having a label indicating that it represents a page for a real-world entity to each additional node). In some embodiments, once the online system 140 has generated 310 the graph of nodes, it may store the graph of nodes (e.g., in the graph store 230).

Figure 4:
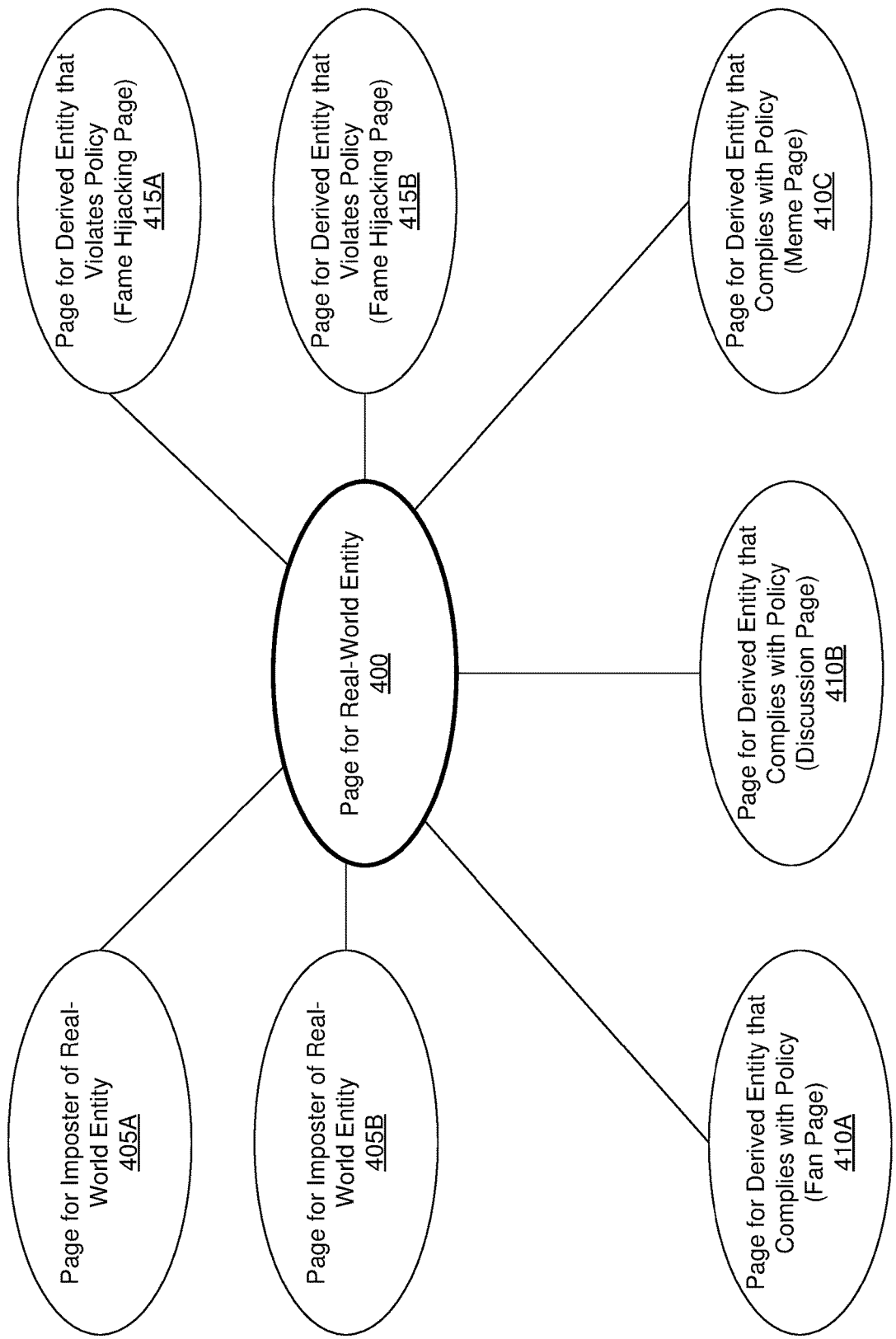
FIG. 4 is an example graph of nodes that represent pages maintained in an online system, in accordance with an embodiment.

The online system 140 then accesses 315 the graph of nodes, in which each node within the graph is labeled to indicate that the corresponding page is for a real-world entity, an imposter of a real-world entity, a derived entity that complies with a policy of the online system 140, or a derived entity that violates the policy. FIG. 4 illustrates an example of the graph of nodes, in which node 400 is labeled to indicate that it represents a page for a real-world entity. Node 400 is connected to nodes 405A-B, which are labeled to indicate that they each represent a page for an imposter of the real-world entity. Furthermore, node 400 also is connected to nodes 410A-C, which are labeled to indicate that they represent pages for derived entities that comply with a policy of the online system 140 (i.e., a fan page 410A, a discussion page 410B, and a meme page 410C). Finally, node 400 also is connected to nodes 415A-B, which are labeled to indicate that they each represent a page for a derived entity that violates a policy of the online system 140 (i.e., fame hijacking pages).

Referring back to FIG. 3, the online system 140 then retrieves 320 (e.g., using the prediction module 250) multiple machine-learning models that are trained (e.g., using the machine-learning module 245) to make various types of predictions about pages maintained 305 in the online system 140. As described above, the machine-learning models may include a first model that predicts whether pages maintained 305 in the online system 140 are for derived entities, a second model that predicts whether the pages are for real-world entities or imposters of real-world entities, and a third model that predicts whether the pages are for derived entities that violate a policy of the online system 140 or derived entities that comply with the policy. In alternative embodiments, the online system 140 may retrieve a single machine-learning model that predicts whether pages maintained 305 in the online system 140 are for real-world entities, imposters of real-world entities, derived entities that violate a policy of the online system 140, or derived entities that comply with the policy. As described above, each machine-learning model retrieved 320 by the online system 140 may be trained based on labels for a set of nodes included in the graph of nodes and a set of features of each corresponding page.

Figure 5:
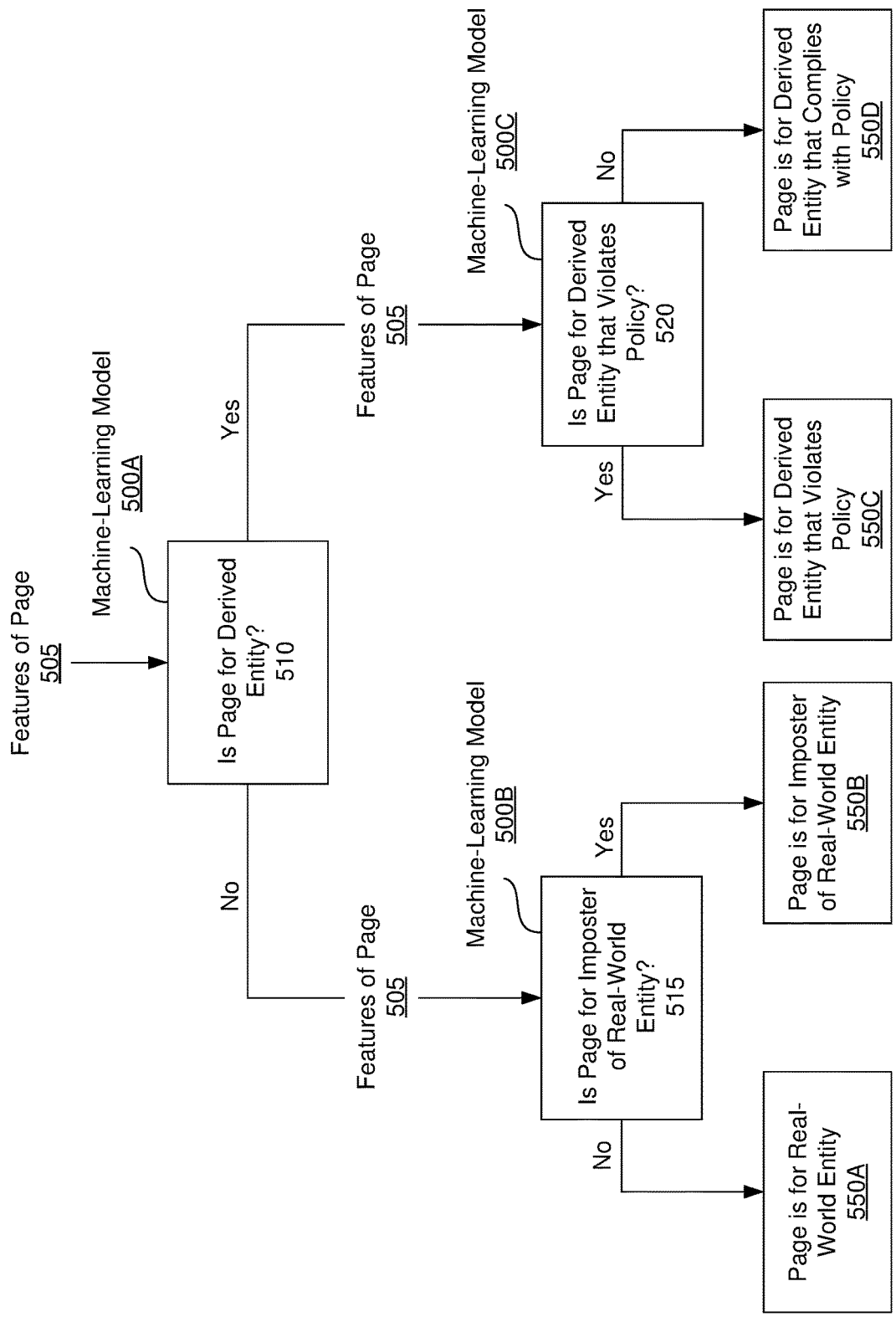
FIG. 5 illustrates an example of detecting a page for a real-world entity, an imposter of a real-world entity, or a non-real-world entity that complies with or violates a policy of an online system, in accordance with an embodiment.

Once the online system 140 has retrieved 320 the machine-learning models, the online system 140 uses 325 a first machine-learning model to predict whether a page maintained 305 in the online system 140 is for a derived entity based on a set of features of the page (e.g., a title of the page, a name associated with the page, a topic of the page, etc.). The online system 140 may access and retrieve a set of features of the page (e.g., from the user profile store 205, the content store 210, the action log 220, and/or the edge store 225). As shown in the example of FIG. 5, the online system 140 may then provide the set of features 505 as an input to the first machine-learning model 500A, which predicts 510 whether the page is for a derived entity. The online system 140 then receives an output from the first machine-learning model corresponding to the prediction indicating whether the page is for a derived entity.

Referring back to FIG. 3, based on the prediction made by the first machine-learning model, the online system 140 may use 330, 335 (e.g., using the prediction module 250) a second machine-learning model or a third machine-learning model to make an additional prediction about the page. Responsive to predicting that the page is not for a derived entity, the online system 140 uses 330 a second machine-learning model to predict whether the page is for a real-world entity or an imposter of a real-world entity based on the set of features of the page. Alternatively, responsive to predicting that the page is not for a derived entity, the online system 140 uses 335 a third machine-learning model to predict whether the page is for a derived entity that complies with or violates a policy of the online system 140 based on the set of features of the page. For example, as shown in the example of FIG. 5, if the first machine-learning model 500A predicts 510 that the page is not for a derived entity, the online system 140 then uses 330 a second machine-learning model 500B to predict 515 whether the page is for a real-world entity 550A or an imposter of a real-world entity 550B based on the set of features of the page 505. Alternatively, in the above example, if the first machine-learning model 500A predicts 510 that the page is for a derived entity, the online system 140 then uses 335 a third machine-learning model 500C to predict 520 whether the page is for a derived entity that violates a policy of the online system 140 550C or a derived entity that complies with the policy 550D based on the set of features of the page 505.

As described above, in some embodiments, the online system 140 retrieves a single machine-learning model that predicts whether the page is for a real-world entity, an imposter of a real-world entity, a derived entity that violates a policy of the online system 140, or a derived entity that complies with the policy. In such embodiments, the online system 140 may use (e.g., using the prediction module 250) the single machine-learning model by providing the set of features of the page as an input to the model. The online system 140 then receives an output from the model corresponding to the prediction.

Once the online system 140 has used 325, 330, 335 the machine-learning model(s) to make the prediction(s) about the page, the online system 140 may take various actions based on the prediction(s). In some embodiments, the online system 140 may generate 310 or update (e.g., using the graph generator 235) a graph of nodes maintained in the online system 140 (e.g., in the graph store 230). For example, the online system 140 may generate a node in a new or an existing graph of nodes and assign a label to the node corresponding to the prediction made by the machine-learning model(s). The online system 140 also or alternatively may take actions to enforce a policy of the online system 140 if the machine-learning model(s) predict(s) that the page is for an imposter of a real-world entity or is for a derived entity that violates a policy of the online system 140. For example, if the page is predicted to be for an imposter of a real-world entity, the online system 140 may unpublish the page. As an additional example, if the page is predicted to be for a derived entity that violates a policy of the online system 140 because the page appears to be misleading, the online system 140 may require an administrator of the page to update the page so that it is no longer misleading and may unpublish the page if it is not updated to comply with the policy. Furthermore, the online system 140 may promote the page if the page is predicted to be for a real-world entity or for a derived entity that complies with a policy of the online system 140 (e.g., by increasing a frequency with which the page is recommended to users of the online system 140).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining, at an online system, a plurality of pages for one or more of: a set of real-world entities, a set of imposters of the set of real-world entities, and a set of derived entities; wherein the set of derived entities is a set of non-real-world entities related to the set of real-world entities;
    accessing a graph comprising a plurality of nodes representing the plurality of pages, each of the plurality of nodes having a label indicating that a corresponding page is for a real-world entity, an imposter of the real-world entity, a derived entity that complies with a policy of the online system, or a derived entity that violates the policy;
    retrieving a plurality of machine-learning models, each of the plurality of machine-learning models trained based at least in part on a set of labels for a set of the plurality of nodes and a set of features of each of a set of pages corresponding to the set of the plurality of nodes;
    using a first machine-learning model of the plurality of machine-learning models to predict whether a page maintained in the online system is for a derived entity based at least in part on one or more features of the page;
    responsive to predicting that the page is not for a derived entity, using a second machine-learning model of the plurality of machine-learning models to predict whether the page is for a real-world entity or an imposter of a real-world entity based at least in part on the one or more features of the page; and responsive to predicting that the page is for a derived entity, using a third machine-learning model of the plurality of machine-learning models to predict whether the page is for a derived entity that complies with the policy or a derived entity that violates the policy based at least in part on the one or more features of the page.

2. The method of claim 1, wherein the policy prohibits impersonating an entity.

3. The method of claim 1, wherein the policy prohibits creating a page that is misleading.

4. The method of claim 1, wherein the set of features of each of the set of pages comprises one or more of: a title of each of the set of pages, a name associated with each of the set of pages, a topic of each of the set of pages, a description of each of the set of pages, an image associated with each of the set of pages, information describing user engagement with each of the set of pages, a date that each of the set of pages was created, a fan count for each of the set of pages, a ratio of fans to followers of each of the set of pages, a ratio of content posted to each of the set of pages that is re-shared, information describing a violation of the policy by each of the set of pages, and content posted to each of the set of pages by an administrator of each of the set of pages.

5. The method of claim 4, wherein the information describing user engagement with each of the set of pages comprises one or more selected from the group consisting of:
content posted by one or more users of the online system to each of the set of pages, a set of features of a user of the online system who performed an interaction with each of the set of pages, a number of content items posted to each of the set of pages, a number of comments on each of the set of pages, a number of times that each of the set of pages was shared, a number of times that one or more users of the online system expressed a preference for each of the set of pages, and a number of users of the online system who have established a connection to each of the set of pages.

6. The method of claim 4, wherein the content posted to each of the set of pages by the administrator of each of the set of pages comprises one or more of: text included among the content and a set of features of an image included among the content.

7. The method of claim 1, further comprising:
training the first machine-learning model based at least in part on the label for each of the plurality of nodes and the set of features of each of the plurality of pages;
training the second machine-learning model based at least in part on the label for each of a first set of nodes and the set of features of each of a first set of pages corresponding to the first set of nodes, the label for each of the first set of nodes indicating that the corresponding page is for a real-world entity or an imposter of the real-world entity; and
training the third machine-learning model based at least in part on the label for each of a second set of nodes and the set of features of each of a second set of pages corresponding to the second set of nodes, the label for each of the second set of nodes indicating that the corresponding page is for a derived entity that complies with the policy or a derived entity that violates the policy.

8. The method of claim 1, further comprising:
generating the graph comprising the plurality of nodes based at least in part on a measure of similarity between a page that has been verified to be for a real-world entity and an additional plurality of pages maintained in the online system.

9. The method of claim 8, wherein generating the graph comprising the plurality of nodes comprises:
generating one or more embeddings corresponding to the page that has been verified to be for the real-world entity based at least in part on a set of features of the page that has been verified to be for the real-world entity;
generating one or more additional embeddings corresponding to each of the additional plurality of pages based at least in part on a set of features of each of the additional plurality of pages;
identifying a plurality of embeddings corresponding to the plurality of pages, wherein the plurality of embeddings is within a threshold distance of the one or more embeddings corresponding to the page that has been verified to be for the real-world entity;
generating the plurality of nodes representing the plurality of pages;
assigning the label to each of the plurality of nodes based at least in part on a set of features of each of the plurality of pages; and
generating one or more edges connecting the plurality of nodes based at least in part on the label assigned to each of the plurality of nodes.

10. The method of claim 9, wherein the label is manually assigned to each of the plurality of nodes.

11. A computer program product comprising a non-transitory computer readable storage medium having instructions encoded thereon that, when executed by a processor, cause the processor to:
maintain, at an online system, a plurality of pages for one or more of: a set of real-world entities, a set of imposters of the set of real-world entities, and a set of derived entities; wherein the set of derived entities is a set of non-real-world entities related to the set of real-world entities;
access a graph comprising a plurality of nodes representing the plurality of pages, each of the plurality of nodes having a label indicating that a corresponding page is for a real-world entity, an imposter of the real-world entity, a derived entity that complies with a policy of the online system, or a derived entity that violates the policy;
retrieve a plurality of machine-learning models, each of the plurality of machine-learning models trained based at least in part on a set of labels for a set of the plurality of nodes and a set of features of each of a set of pages corresponding to the set of the plurality of nodes;
use a first machine-learning model of the plurality of machine-learning models to predict whether a page maintained in the online system is for a derived entity based at least in part on one or more features of the page;
responsive to predicting that the page is not for a derived entity, use a second machine-learning model of the plurality of machine-learning models to predict whether the page is for a real-world entity or an imposter of a real-world entity based at least in part on the one or more features of the page; and
responsive to predicting that the page is for a derived entity, use a third machine-learning model of the plurality of machine-learning models to predict whether the page is for a derived entity that complies with the policy or a derived entity that violates the policy based at least in part on the one or more features of the page.

12. The computer program product of claim 11, wherein the policy prohibits impersonating an entity.

13. The computer program product of claim 11, wherein the policy prohibits creating a page that is misleading.

14. The computer program product of claim 11, wherein the set of features of each of the set of pages comprises one or more of: a title of each of the set of pages, a name associated with each of the set of pages, a topic of each of the set of pages, a description of each of the set of pages, an image associated with each of the set of pages, information describing user engagement with each of the set of pages, a date that each of the set of pages was created, a fan count for each of the set of pages, a ratio of fans to followers of each of the set of pages, a ratio of content posted to each of the set of pages that is re-shared, information describing a violation of the policy by each of the set of pages, and content posted to each of the set of pages by an administrator of each of the set of pages.

15. The computer program product of claim 14, wherein the information describing user engagement with each of the set of pages comprises one or more selected from the group consisting of: content posted by one or more users of the online system to each of the set of pages, a set of features of a user of the online system who performed an interaction with each of the set of pages, a number of content items posted to each of the set of pages, a number of comments on each of the set of pages, a number of times that each of the set of pages was shared, a number of times that one or more users of the online system expressed a preference for each of the set of pages, and a number of users of the online system who have established a connection to each of the set of pages.

16. The computer program product of claim 14, wherein the content posted to each of the set of pages by the administrator of each of the set of pages comprises one or more of: text included among the content and a set of features of an image included among the content.

17. The computer program product of claim 11, wherein the computer-readable storage medium further has instructions encoded thereon that, when executed by the processor, cause the processor to:
train the first machine-learning model based at least in part on the label for each of the plurality of nodes and the set of features of each of the plurality of pages;
train the second machine-learning model based at least in part on the label for each of a first set of nodes and the set of features of each of a first set of pages corresponding to the first set of nodes, the label for each of the first set of nodes indicating that the corresponding page is for a real-world entity or an imposter of the real-world entity; and
train the third machine-learning model based at least in part on the label for each of a second set of nodes and the set of features of each of a second set of pages corresponding to the second set of nodes, the label for each of the second set of nodes indicating that the corresponding page is for a derived entity that complies with the policy or a derived entity that violates the policy.

18. The computer program product of claim 11, wherein the computer-readable storage medium further has instructions encoded thereon that, when executed by the processor, cause the processor to:
generate the graph comprising the plurality of nodes based at least in part on a measure of similarity between a page that has been verified to be for a real-world entity and an additional plurality of pages maintained in the online system.

19. The computer program product of claim 18, wherein generate the graph comprising the plurality of nodes comprises:
generate one or more embeddings corresponding to the page that has been verified to be for the real-world entity based at least in part on a set of features of the page that has been verified to be for the real-world entity;
generate one or more additional embeddings corresponding to each of the additional plurality of pages based at least in part on a set of features of each of the additional plurality of pages;
identify a plurality of embeddings corresponding to the plurality of pages, wherein the plurality of embeddings is within a threshold distance of the one or more embeddings corresponding to the page that has been verified to be for the real-world entity;
generate the plurality of nodes representing the plurality of pages;
assign the label to each of the plurality of nodes based at least in part on a set of features of each of the plurality of pages; and
generate one or more edges connecting the plurality of nodes based at least in part on the label assigned to each of the plurality of nodes.

20. The computer program product of claim 19, wherein the label is manually assigned to each of the plurality of nodes.

* * * * *